US008175766B2

(12) United States Patent
Lee et al.

(10) Patent No.: US 8,175,766 B2
(45) Date of Patent: May 8, 2012

(54) THROTTLE CONTROL METHOD AND SYSTEM

(75) Inventors: Charles R. Lee, Talent, OR (US); Daniel M. Riegels, Ashland, OR (US); Michael R. Sorensen, Ashland, OR (US); Brian J. Wismann, Talent, OR (US)

(73) Assignee: Brammo, Inc., Ashland, OR (US)

( * ) Notice: Subject to any disclaimer, the term of this patent is extended or adjusted under 35 U.S.C. 154(b) by 481 days.

(21) Appl. No.: 12/491,820

(22) Filed: Jun. 25, 2009

(65) Prior Publication Data

US 2010/0332059 A1    Dec. 30, 2010

(51) Int. Cl.
*F02D 11/10*    (2006.01)
*G01M 13/00*    (2006.01)
*G06F 19/00*    (2006.01)

(52) U.S. Cl. ............................ 701/22; 701/102; 123/399

(58) Field of Classification Search ................ 701/22, 701/102, 29; 123/399, 336; 73/118.1
See application file for complete search history.

(56) References Cited

U.S. PATENT DOCUMENTS

| 6,276,230 | B1 | 8/2001 | Crum et al. | |
|---|---|---|---|---|
| 7,010,955 | B2 | 3/2006 | Suzuki | |
| 7,231,904 | B2 | 6/2007 | Hino et al. | |
| 7,287,512 | B2 | 10/2007 | Possehl et al. | |
| 2006/0081218 | A1* | 4/2006 | Hino et al. | 123/399 |
| 2007/0006845 | A1* | 1/2007 | Williams et al. | 123/399 |
| 2008/0022970 | A1* | 1/2008 | Maruo et al. | 123/399 |
| 2008/0243357 | A1* | 10/2008 | Asada et al. | 701/102 |

* cited by examiner

*Primary Examiner* — Tan Q Nguyen
(74) *Attorney, Agent, or Firm* — Rajesh Vallabh; Foley Hoag LLP

(57) ABSTRACT

A throttle control system is provided for generating a throttle control signal in an electric vehicle. The throttle control system includes: a throttle position sensor operable to detect a throttle twist input by an operator and to responsively generate a throttle twist input signal; a controller operatively coupled to the throttle position sensor for receiving the throttle twist input signal and responsively generating a throttle control signal; and a feedback circuit operatively coupled to the controller for receiving the throttle control signal and outputting a corresponding feedback signal to the controller; wherein the controller compares the feedback signal and the throttle control signal to detect an error condition in the throttle control signal, and when an error condition is detected, determines a responsive action corresponding to the severity of the error condition.

23 Claims, 7 Drawing Sheets

THROTTLE CONTROL METHOD AND SYSTEM

BACKGROUND

The present application relates generally to electric vehicles and, more particularly, to a throttle control method and apparatus.

In electric vehicles (such as electric motorcycles), throttle control systems are used to control operation of the electric motor of the vehicle. The throttle control systems detect a throttle grip twist by an operator, and generate throttle control signals proportional to the throttle grip twist for controlling the electric motor.

BRIEF SUMMARY OF EMBODIMENTS OF THE INVENTION

In accordance with one or more embodiments of the invention, a throttle control system is provided for generating a throttle control signal in an electric vehicle. The throttle control system includes: a throttle position sensor operable to detect a throttle twist input by an operator and to responsively generate a throttle twist input signal; a controller operatively coupled to the throttle position sensor for receiving the throttle twist input signal and responsively generating a throttle control signal; and a feedback circuit operatively coupled to the controller for receiving the throttle control signal and outputting a corresponding feedback signal to the controller; wherein the controller compares the feedback signal and the throttle control signal to detect an error condition in the throttle control signal, and when an error condition is detected, determines a responsive action corresponding to the severity of the error condition.

In accordance with one or more embodiments of the invention, a throttle control system is provided for generating a throttle control signal in an electric vehicle. The throttle control system includes: a throttle position sensor operable to detect a throttle twist input by an operator and to responsively generate a throttle twist input signal; a zero position sensor operable to detect a rest throttle twist position; a controller operatively coupled to the throttle position sensor and to the zero position sensor, the controller receiving the throttle twist input signal from the throttle position sensor and responsively generating a throttle control signal; wherein the controller sets the throttle control signal to zero when a rest throttle twist position is detected by the zero position sensor, and wherein the throttle twist input signal from the throttle position sensor is used to generate the throttle control signal only when the zero position sensor detects a non-rest throttle twist position for self-calibration.

In accordance with one or more embodiments of the invention, a method of generating a throttle control signal in an electric vehicle is provided. The method includes the steps of: detecting a throttle twist input by an operator and generating a corresponding throttle twist input signal; generating a throttle control signal from the throttle twist input signal; providing a feedback signal based on the throttle control signal; and comparing the feedback signal and the throttle control signal to detect an error condition in the throttle control signal, and when an error condition is detected, determining a responsive action corresponding to the severity of the error condition.

In accordance with one or more embodiments of the invention, a method for generating a throttle control signal in an electric vehicle is provided. The method includes the steps of: using a throttle position sensor operable to detect a throttle twist input by an operator and to generate a throttle twist input signal; using a zero position sensor to detect a rest throttle twist position; generating a throttle control signal based on the throttle twist input signal from the throttle position sensor; setting the throttle control signal to zero when a rest throttle twist position is detected by the zero position sensor, and generating the throttle control signal only when the zero position sensor detects a non-rest throttle twist position for self-calibration.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

DETAILED DESCRIPTION

Figure 1:
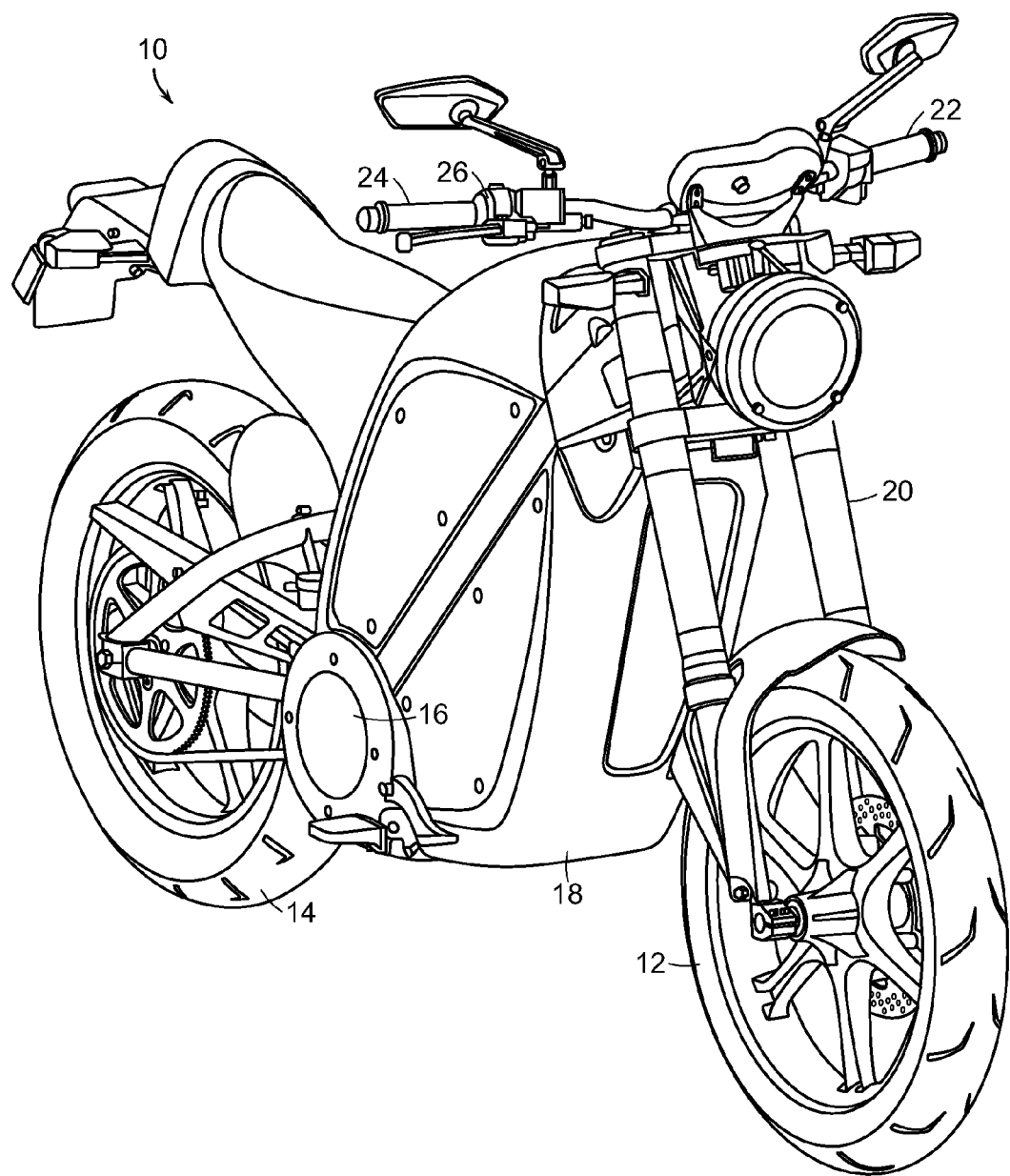
FIG. 1 is a perspective view of an exemplary electric vehicle incorporating a throttle control apparatus in accordance with one or more embodiments of the invention.

FIG. 1 illustrates an example of an electric vehicle 10 (in this case an electric motorcycle), in which a throttle control system in accordance with one or more embodiments can be implemented. The electric vehicle includes a front wheel 12, a rear wheel 14, an electric motor 16, and a support structure 18 interconnecting the front and rear wheels 12, 14. The electric vehicle 10 also includes a steering assembly 20 coupled to the frame 18. The steering assembly 20 is pivotable about a steering axis and includes a handlebar for imparting pivotal motion to the steering assembly. The handlebar includes a left-side grip 22 and a right-side grip 24 (which is the throttle grip) that can be grasped by the operator to control the electric vehicle 10.

A throttle control apparatus 26 in accordance with one or more embodiments of the invention is positioned inwardly of the throttle grip 24. The throttle control apparatus 26 sends throttle control signals to a motor controller, which controls operation of the electric motor 16.

Figure 2:
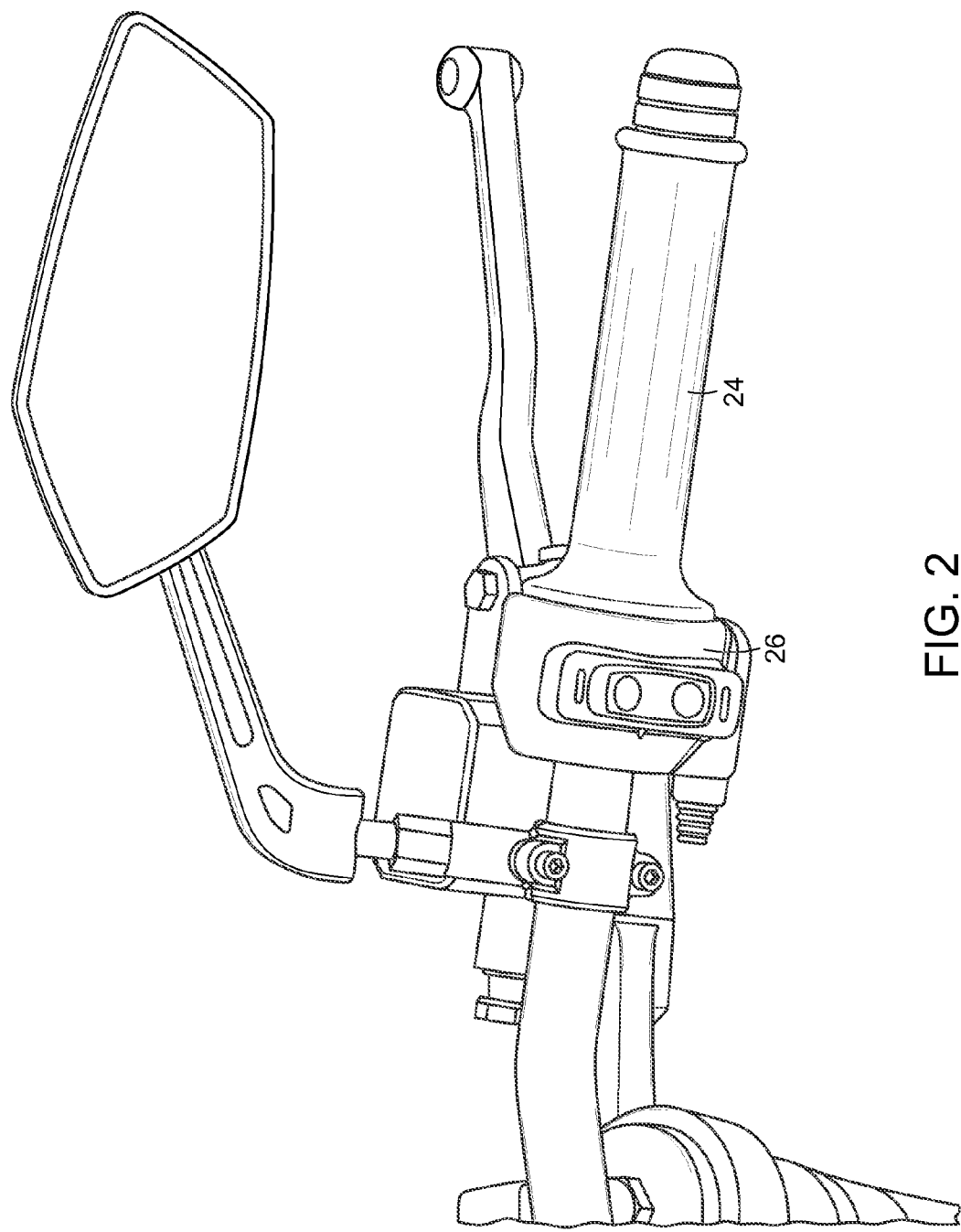
FIG. 2 is a perspective view of an exemplary throttle grip and throttle control apparatus in accordance with one or more embodiments of the invention.
Figure 3:
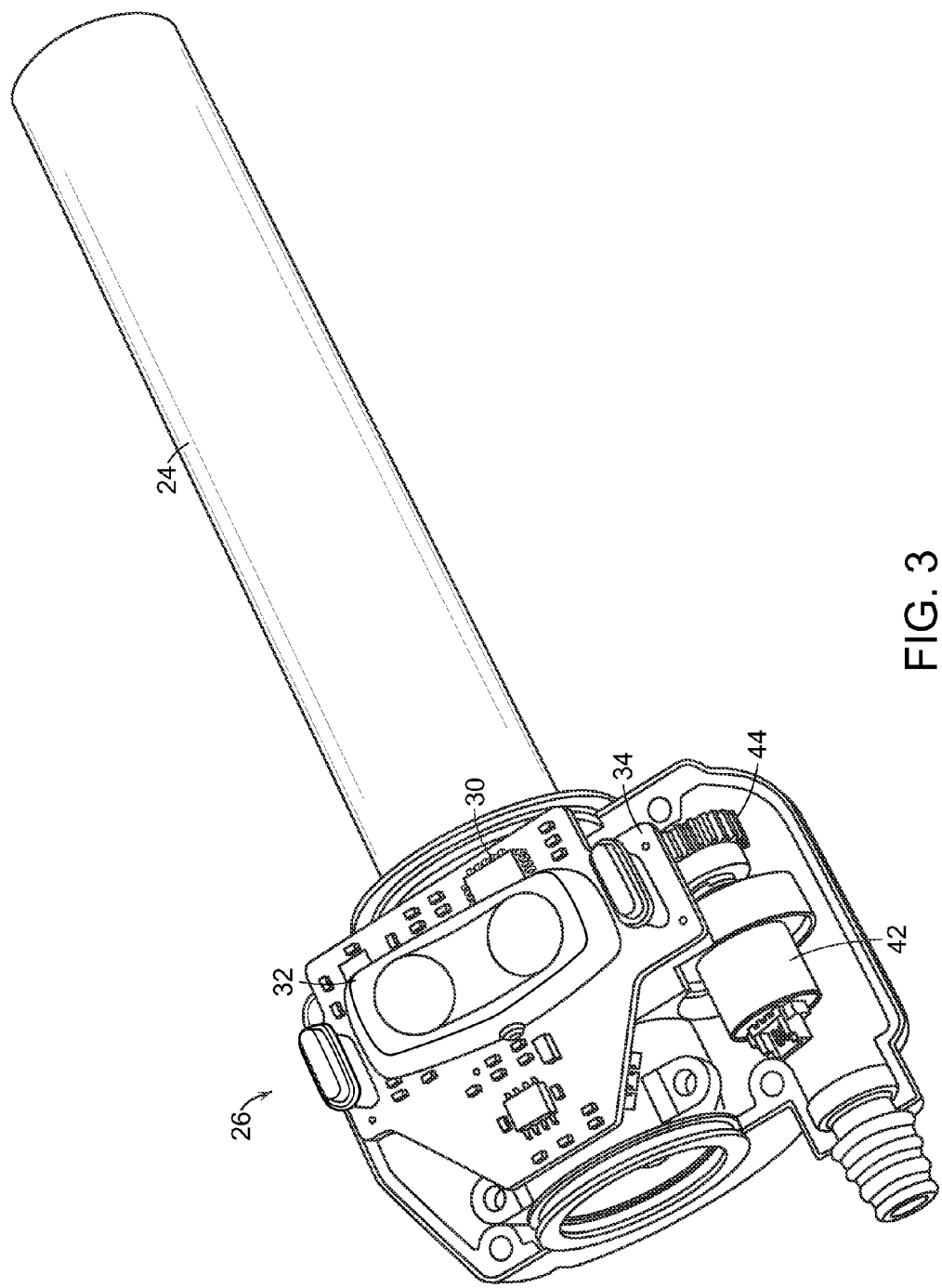
FIG. 3 is a perspective view of the exemplary throttle grip and throttle control apparatus of FIG. 2 with a portion of the cover removed for purposes of illustration.
Figure 4:
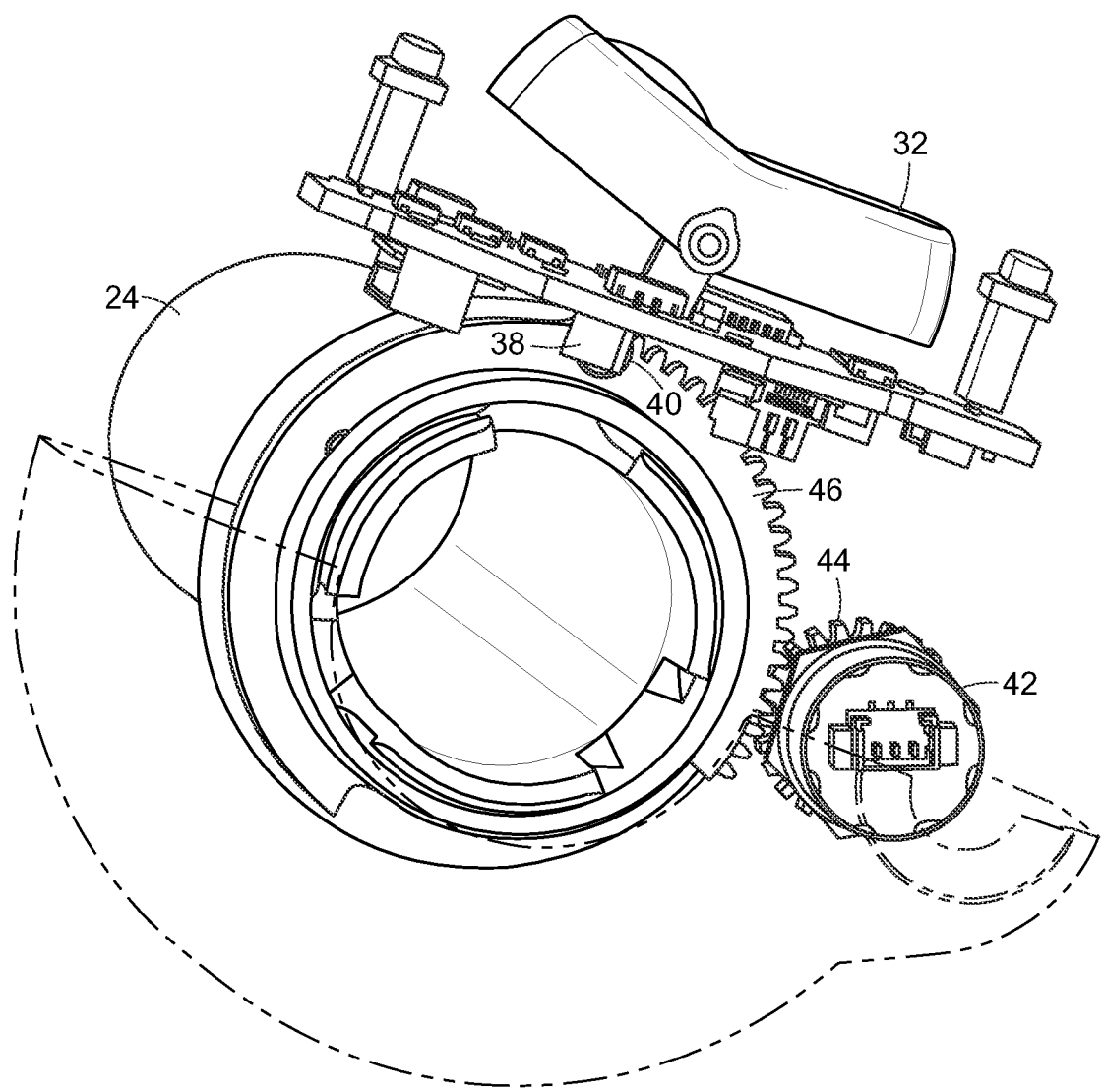
FIG. 4 is a side perspective view of the exemplary throttle control apparatus of FIGS. 2 and 3 with portions thereof removed for purposes of illustration.
Figure 4A:
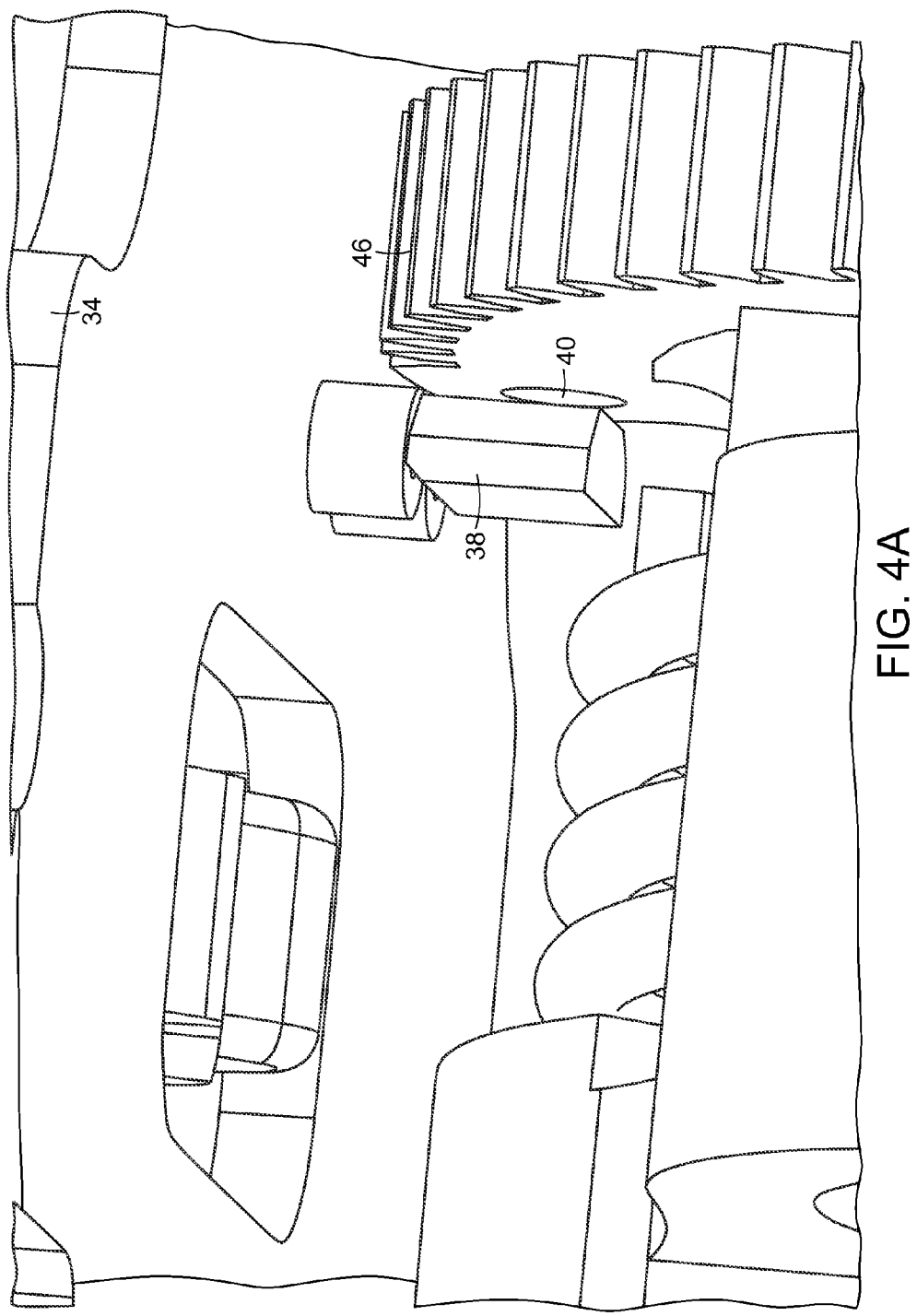
FIG. 4A is an enlarged perspective view of a portion of the throttle control apparatus to further illustrate the zero position sensor.

FIGS. 2-4 are enlarged views of the throttle grip 24 and the throttle control apparatus 26 in accordance with one or more embodiments. FIG. 2 illustrates the throttle control apparatus 26 enclosed within a housing. In FIG. 3, a portion of the housing is removed to illustrate components of the throttle control apparatus therein. FIG. 4 illustrates a side perspective view of the throttle control apparatus 26, also with certain portions removed for purposes of illustration.

The throttle control apparatus 26 includes an on/off rocker switch 32 that can be operated by a user to turn the electric vehicle on or off. The rocker switch 32 is pivotally mounted above a printed circuit board (PCB) 34, which includes an on magnetic sensor and an off magnetic sensor. The on magnetic sensor and the off magnetic sensor detect the close presence of magnets (not shown) within the rocker switch 32 in order to determine whether the rocker switch 32 is in an on position or in an off position.

The throttle control apparatus 26 includes a controller 30 mounted on the PCB 34. The controller 30 is coupled to and controls operation of the electric motor controller 36. The controller 30 can comprise a microcontroller, microprocessor, digital signal processor, application-specific integrated circuit (ASIC), field programmable gate arrays (FPGA), or any general-purpose or special-purpose circuitry that can be programmed or configured to perform the functions described herein. By way of non-limiting example, the controller 30 can be implemented in an 8051-based microcontroller available from Silicon Laboratories, Inc.

The throttle control apparatus 26 also includes a zero position sensor 38, which detects when the throttle grip 24 is at a zero (i.e., rest) position. In some embodiments, the zero position sensor 38 is a magnetic position sensor (e.g., a Hall-effect sensor) mounted on the PCB 34. The zero position sensor 38 detects the zero position of a magnet 40 attached to the throttle grip 24. Other examples of sensors suitable for use as the zero position sensor 38 include capacitive sensors, inductive sensors, and optical sensors. The zero position sensor 38 communicates with the controller 30 and notifies the controller 30 when the throttle grip 24 is at the zero position.

The throttle control apparatus 26 also includes a throttle position sensor 42 operable to detect a throttle twist input by an operator on the throttle grip 24. The throttle position sensor 42 is operatively coupled to the controller 30 and transmits throttle twist input signals to the controller 30 proportional to the position or twist of the throttle grip 24. The throttle position sensor 42 is mounted on a gearing mechanism connected with the throttle grip 24. In particular, as shown in FIG. 4, the throttle position sensor 42 is mounted on a gear 44, whose teeth mesh with the teeth of a gear 46 connected to the throttle grip 24. Examples of sensors suitable for use as a throttle position sensor 42 include magnetic sensors (e.g., Hall-effect sensors), capacitive sensors, inductive sensors, and optical encoders.

Figure 5:
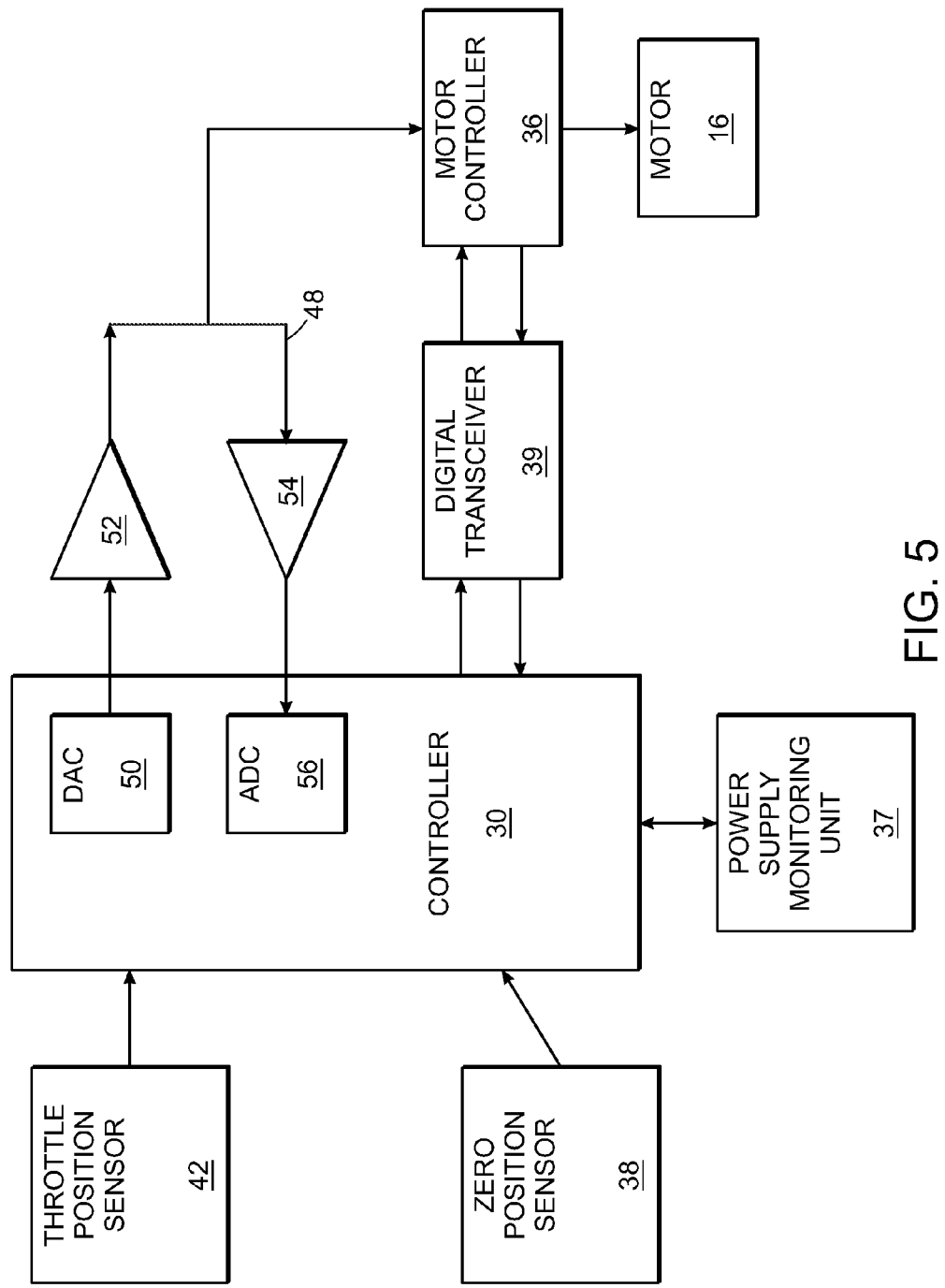
FIG. 5 is a schematic block diagram of an exemplary throttle control apparatus in accordance with one or more embodiments of the invention.

FIG. 5 is a schematic block diagram of a throttle control system in accordance with one or more embodiments. As shown, the controller 30 is coupled to and receives input signals from the throttle position sensor 42. The controller 30 generates throttle control signals proportional to the twist of the throttle grip 24, and provides the throttle control signal to the motor controller 36. The motor controller 36 is coupled to and controls the operation of the electric motor 16 based on the throttle control signal.

In some embodiments, the controller 30 can be configured to output throttle control signals to the motor controller 36 in either digital form (as a series of digital bytes) or analog form, depending on the type of input signals supported by the particular motor controller 36 used.

The throttle controller 30 also communicates with a power supply monitoring unit 37. If the throttle's power supply starts to fail (goes out of specification), the controller can shut off the throttle output before any errors are induced by the failing power supply.

In accordance with one or more embodiments of the invention, the throttle control apparatus 26 includes a feedback circuit 48 for detecting an error condition in the throttle control signals. Error conditions in the throttle control signals can result, e.g., from signal conditioning errors or a shorted circuit. The controller 30 includes a digital to analog converter 50 for outputting an analog throttle control signal. The analog throttle control signal is processed by an operational amplifier 52, which buffers and amplifies the signal, which is then routed to the motor controller 36. The buffered/amplified signal is also provided to the feedback circuit 48, where it is processed by a second operational amplifier 54 and then provided to an analog to digital converter 56 of the controller 30. The controller 30 compares the feedback signal converted by the analog to digital converter 56 and the throttle control signal provided to the digital to analog converter 50 to detect any error conditions in the throttle control signal. The controller 30 determines the severity of the error condition, and takes an appropriate responsive action.

Figure 6:
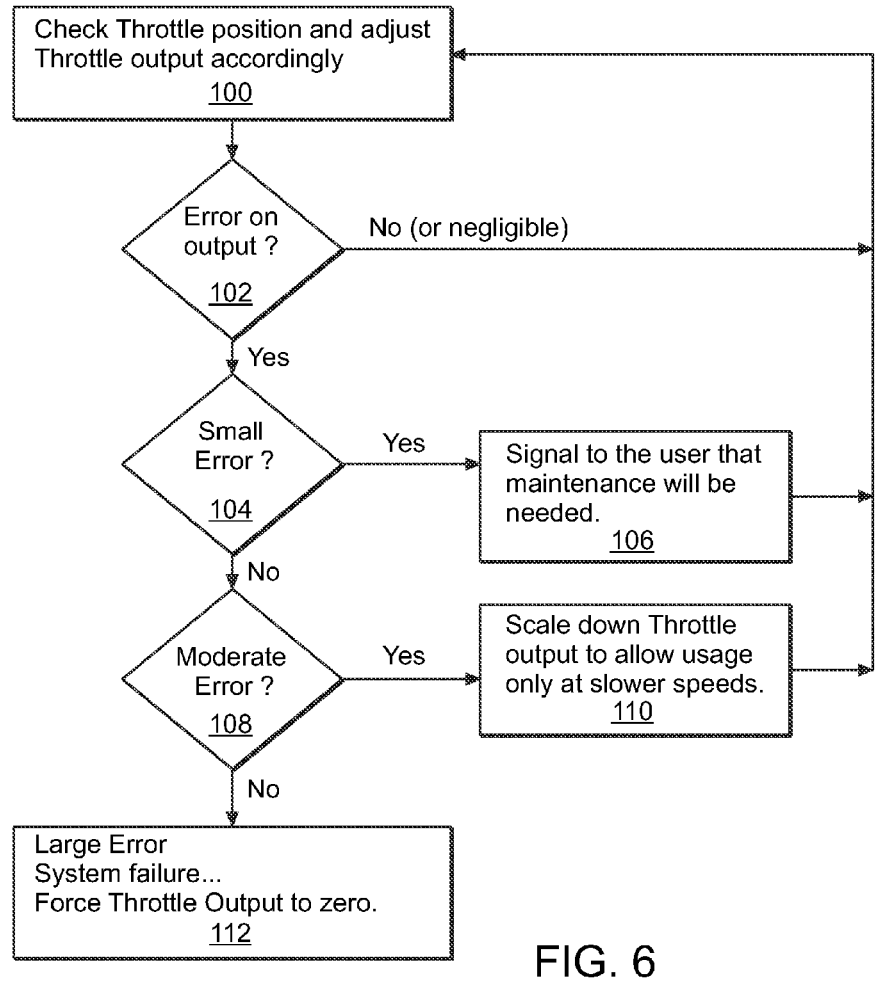
FIG. 6 is a flow chart illustrating a method of error detection and response in accordance with one or more embodiments of the invention.

FIG. 6 is a flow chart illustrating the error detection and response process in accordance with one or more embodiments. At step 100, the throttle control apparatus 26 detects the twist of the throttle grip 24 and generates throttle control signals proportional to the twist. At step 102, the controller 30 compares the feedback signal to the throttle control signal to detect any error conditions in the throttle control signal. If there is no error or the error is negligible (e.g., an error of up to approximately 2 percent), then the error can be ignored, and no responsive action taken.

If the error is determined to be small (e.g., an error range of approximately 2 to 10 percent) at step 104, the controller 30 can continue to output throttle control signals to the motor controller 36 in an uninterrupted manner. However, the controller 30 activates a "maintenance/service needed" indicator to indicate to the user that maintenance might be needed to correct the error condition at step 106.

If the error is determined to be a moderate error (e.g., an error range of approximately 10 to 20 percent) at step 108, the motor controller 36 can allow the electric vehicle 10 to continue to be used for a given time period at step 110, but only at a reduced top speed such that the rider can reach a service destination or to return home.

If the error is determined to be a large error (e.g., an error above approximately 20 percent) indicating a potentially dangerous condition at step 112, the controller 30 can force the throttle output to zero, thereby stopping the electric vehicle 10.

It should be understood that the error condition ranges provided above are exemplary only, and can be varied as desired.

In accordance with one or more embodiments, with respect to a controller providing digital throttle control signals to the motor controller, the motor controller 36 can determine if the digital data received contained an error (determined, e.g., by parity, CRC or other methods of detecting digital errors), and can notify the controller 30 accordingly. As with the analog control signals described above, the controller 30 can determine the severity of the error and take an appropriate responsive action.

In accordance with one or more embodiments of the invention, the throttle control apparatus 26 includes a safety feature utilizing the outputs of the zero position sensor 38 and the throttle position sensor 42. The zero position sensor 38 senses when the throttle grip 24 has reached a zero (i.e., rest) position. The throttle position sensor 42 detects the amount of twist on the throttle grip 24. The two states are exclusive of each other, i.e., the throttle cannot be twisted while maintaining the zero position. The combination of the outputs of the zero position sensor 38 and the throttle position sensor 42 can be used to help prevent potential accidents that could result from turning on the bike while the throttle grip 24 is in a non-zero (throttle is not at rest) position. Additionally, if the throttle gearing slips, the zero-position will occur at a different reading for the throttle grip position (as a deviation from what is expected). In this case it can either re-calibrate (if the difference is very small) as discussed below, or signal an error if the new zero-position is significantly different from what was detected before.

In accordance with one or more embodiments, the outputs of the throttle position sensor 42 and the zero position sensor 38 can also be used together to form a self-calibrating throttle control. The controller 30 is configured to reset the throttle control signal to zero when a zero position is detected by the zero position sensor 38 (if it has not already achieved this from the throttle position sensor 42). The controller 30 is configured to utilize the output of the throttle position sensor 42 only when movement has started on the throttle grip 24 from the zero position as detected by the zero position sensor 38.

The controller 30 monitors the output of the throttle position sensor 42 and the zero position sensor 38, resetting the output to zero when a zero position is detected by the zero position sensor 38, and scaling the output according to a range allowed by the throttle position sensor 42.

The controller 30 determines the output voltage for the throttle control signal based on the known maximum amount of twisting the throttle grip 24 can make and the output range of the throttle position sensor 42. The controller 30 can perform calculations to properly scale between the two for maximum resolution. An example of this follows:

The throttle grip 24 for a particular electric vehicle 10 can twist a maximum of 70 degrees. A Hall-effect sensor is used as a zero position sensor 38 to detect the zero position. An Optical Encoder is used as the throttle position sensor 42 for measuring the twist of the throttle grip 24, and can provide 900 pulses for the 70 degree range. (The gearing between the throttle grip 24 and the optical encoder can make numbers larger or smaller depending on the design of the system). The DAC output of the controller 30 has 10-bit resolution (equals 0-1023 range) and a maximum of 5 V output.

The rotational resolution in this example would be equal to the Maximum rotation divided by the maximum number of pulses in that rotation=70/900=0.078 degrees per pulse. The Throttle output scaling by the controller 30 for one incremental pulse from the optical encoder would be equal to the Maximum voltage for the DAC divided by the maximum pulses in rotation=5/900=0.0056 Volts per encoder pulse.

The output (once calculated) can be sent to the motor controller 36 either in analog form (via the DAC 50), or a digital representation of that number and transmitted through a digital transceiver 39 (e.g., UART, I2C, SPI, CAN, etc.).

In accordance with one or more embodiments, the throttle control apparatus 26 includes a set of built-in diagnostics that can be performed automatically (e.g., at start-up) or initiated via external commands at any time. Such diagnostics improves the reliability of the system, and helps keep the system operating within specification. Self-diagnostics include, but are not limited to: (1) power supply check, (2) firmware code checksum test, (3) sensor voltage check, (4) analog output signal check (including percentage of error between output and input), (5) digital communication detection, and (6) loopback tests.

In accordance with one or more embodiments, the controller 30 can be configured to operate with different motor controllers. The throttle control signals of the controller 30 (either analog or digital) can be mapped to different motor controllers, allowing generally optimum performance without having to physically redesign the throttle control board to match different motor controllers.

The throttle control signals from the controller 30 can be mapped to adjust for different motor controllers using, e.g., internal look-up-tables (LUTs). The mapping can be set via commands through the digital channel—or during factory programming.

Figure 7:
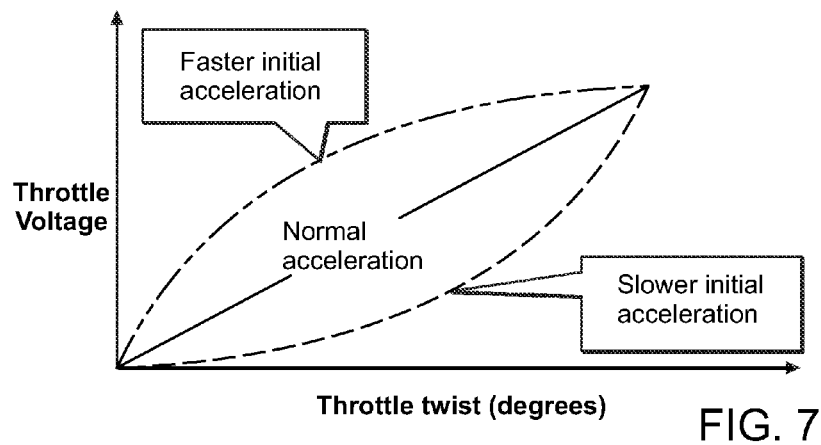
FIG. 7 is a simplified graph illustrating configuration of a controller of the throttle control apparatus in accordance with one or more embodiments of the invention for use with one of a plurality of motor controllers used therewith.

In some cases, based on the output of the throttle position sensor 42, the controller 30 outputs a throttle control signal that is generally linear as illustrated in the graph of FIG. 7. In other cases, it may be desirable to have a different response to the throttle twist—either being more active (faster acceleration at first)—or less active (greater acceleration at higher speeds). These outputs can be adjusted via a programmed Look-up Tables (LUTs) or mathematically calculated on the fly.

In accordance with one or more embodiments, the throttle control apparatus 26 can operate in a power-savings mode when the throttle position is at zero (the electric vehicle is at rest). For example, the throttle position sensor can be powered off until the zero position sensor 38 detects that the throttle grip 24 has moved from the zero position in order to conserve power.

In accordance with one or more embodiments, the controller 30 includes a watchdog timer, which will force a throttle output reset (i.e., to zero) if one or more internal conditions are not met within a given period of time. By way of example, the watchdog timer can force a throttle output reset if the throttle position sensor 42 becomes inactive within a given period of time, e.g., the last 1/10 of a second. This security feature helps ensure that the controller 30 does not operate in an unknown state, which could cause erroneous signals to be sent to the motor controller.

In accordance with one or more embodiments of the invention, operation of the throttle position sensor 42 can be strobed, i.e., it can be turned on quickly to take readings, and then shut off immediately afterwards to conserve power. Some encoders (i.e. optical encoders) require moderate amounts of current to operate, and though small in comparison to what is drawn by the electric motor (which operates the electric vehicle), it can be a constant drain on the battery capacity. Turning on the encoder to take a reading and then powering it back off when the reading is completed helps improve the efficiency of the electric vehicle system.

In accordance with one or more embodiments of the invention, the throttle position sensor 42 comprises a Hall-effect sensor to measure the throttle twist, which uses reduced power compared to an optical encoder. In this embodiment, the Hall-effect sensor is calibrated at the factory during setup by twisting the throttle grip 24 completely so the controller 30 can measure the extremes of the Hall-effect sensor's output. The controller 30 can then store internally both extremes of the Hall-effect sensor output in Flash memory, and then calculate throttle grip position from this.

Although an electric motorcycle is described in the exemplary embodiments described herein, it should be understood that throttle control systems in accordance with various embodiments can be implemented in any electric vehicle.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

What is claimed is:

1. A throttle control system for generating a throttle control signal in an electric vehicle, comprising:
    a throttle position sensor operable to detect a throttle twist input by an operator and to responsively generate a throttle twist input signal;
    a controller operatively coupled to the throttle position sensor for receiving the throttle twist input signal and responsively generating a throttle control signal; and
    a feedback circuit operatively coupled to the controller for receiving the throttle control signal and outputting a corresponding feedback signal based on the throttle control signal to the controller;
    wherein the controller compares the feedback signal and the throttle control signal to detect an error condition in the throttle control signal, and when an error condition is detected, determines a responsive action corresponding to the severity of the error condition.

2. The throttle control system of claim 1, wherein the controller includes a digital to analog converter outputting the throttle control signal, and an analog to digital converter for receiving the feedback signal, and wherein the feedback circuit comprises a first operational amplifier and a second operational amplifier, wherein the first operational amplifier processes the throttle control signal and provides an output to a motor controller and to the second operational amplifier, and wherein the output of the second operational amplifier comprises the feedback signal provided to the analog to digital converter of the controller.

3. The throttle control system of claim 1, wherein
    when the error condition is within a first error range, the responsive action comprises providing an error notification signal to the operator,
    when the error condition is within a second error range having a greater severity than the first error range and a lesser severity than a third error range, the responsive action comprises adjusting the throttle control signal to correspond to a slower speed, and
    when the error condition is within the third error range, which has a greater severity than the second error range, the responsive action comprises adjusting the throttle control signal to stop the vehicle.

4. The throttle control system of claim 1, wherein the controller is programmable to output throttle control signals mapped to a selected one of a plurality of motor controllers.

5. The throttle control system of claim 1, further comprising a zero position sensor operable to detect a rest throttle twist position, and wherein the controller sets the throttle control signal to zero when a rest throttle twist position is detected by the zero position sensor, and wherein the throttle twist input signal from the throttle position sensor is used to generate the throttle control signal only when the zero position sensor detects a non-rest throttle twist position for self-calibration.

6. The throttle control system of claim 5, wherein the zero position sensor comprises a magnetic sensor, capacitive sensor, inductive sensor, or optical sensor.

7. The throttle control system of claim 1, wherein the controller is operable power down internal circuitry used only when the vehicle is moving when a rest throttle twist position is detected.

8. The throttle control system of claim 1, wherein the controller comprises a microcontroller, microprocessor, digital signal processor, ASIC, or FPGA.

9. The throttle control system of claim 1, wherein the throttle position sensor comprises a magnetic sensor, capacitive sensor, inductive sensor, or optical encoder.

10. The throttle control system of claim 1, wherein the controller further comprises a watchdog timer operable to set the throttle control signal to zero if one or more given conditions are not met within a given period of time.

11. A throttle control system for generating a throttle control signal in an electric vehicle, comprising:
    a throttle position sensor operable to detect a throttle twist input by an operator and to responsively generate a throttle twist input signal;
    a zero position sensor operable to detect a rest throttle twist position;
    a controller operatively coupled to the throttle position sensor and to the zero position sensor, the controller receiving the throttle twist input signal from the throttle position sensor and responsively generating a throttle control signal;
    wherein the controller sets the throttle control signal to zero when a rest throttle twist position is detected by the zero position sensor, and wherein the throttle twist input signal from the throttle position sensor is used to generate the throttle control signal only when the zero position sensor detects a non-rest throttle twist position for self-calibration.

12. The throttle control system of claim 11, wherein the zero position sensor comprises a photo sensor, magnetic sensor, capacitive sensor, inductive sensor, or optical sensor.

13. The throttle control system of claim 11, wherein the controller is programmable to output throttle control signals mapped to a selected one of a plurality of motor controllers.

14. The throttle control system of claim 11, wherein the controller is operable power down internal circuitry used only when the vehicle is moving when a rest throttle twist position is detected.

15. The throttle control system of claim 11, wherein the controller comprises a microcontroller, microprocessor, digital signal processor, ASIC, or FPGA.

16. The throttle control system of claim 11, wherein the throttle position sensor comprises a magnetic sensor, capacitive sensor, inductive sensor, or optical encoder.

17. The throttle control system of claim 11, wherein the controller further comprises a watchdog timer operable to set the throttle control signal to zero if one or more given conditions are not met within a given period of time.

18. A method of generating a throttle control signal in an electric vehicle, comprising:
    detecting a throttle twist input by an operator and generating a corresponding throttle twist input signal;
    generating a throttle control signal from the throttle twist input signal;

providing a feedback signal based on the throttle control signal; and comparing the feedback signal and the throttle control signal to detect an error condition in the throttle control signal, and when an error condition is detected, determining a responsive action corresponding to the severity of the error condition.

19. The method of claim 18, wherein when the error condition is within a first error range, the responsive action comprises providing an error notification signal to the operator, when the error condition is within a second error range having a greater severity than the first error range, the responsive action comprises adjusting the throttle control signal to correspond to a slower speed, and when the error condition is within a third error range having a greater severity than the second error range, the responsive action comprises adjusting the throttle control signal to stop the vehicle.

20. The method of claim 18, further comprising using a zero position sensor operable to detect a rest throttle twist position, and setting the throttle control signal to zero when a rest throttle twist position is detected by the zero position sensor, and generating the throttle control signal only when the zero position sensor detects a non-rest throttle twist position for self-calibration.

21. The method of claim 18, further comprising using a watchdog timer to set the throttle control signal to zero if one or more given conditions are not met within a given period of time.

22. A method for generating a throttle control signal in an electric vehicle, comprising:

using a throttle position sensor operable to detect a throttle twist input by an operator and to generate a throttle twist input signal;

using a zero position sensor to detect a rest throttle twist position;

generating a throttle control signal based on the throttle twist input signal from the throttle position sensor;

setting the throttle control signal to zero when a rest throttle twist position is detected by the zero position sensor, and generating the throttle control signal only when the zero position sensor detects a non-rest throttle twist position for self-calibration.

23. The method of claim 22, further comprising using a watchdog timer to set the throttle control signal to zero if one or more given conditions are not met within a given period of time.

* * * * *